(12) United States Patent
Monajemi et al.

(10) Patent No.: US 12,501,353 B2
(45) Date of Patent: Dec. 16, 2025

(54) LINK COORDINATION IN MULTI-LINK DEVICES

(71) Applicant: Cisco Technology, Inc., San Jose, CA (US)

(72) Inventors: Pooya Monajemi, San Jose, CA (US); Brian D. Hart, Sunnyvale, CA (US); Vishal S. Desai, San Jose, CA (US); Peiman Amini, Fremont, CA (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 433 days.

(21) Appl. No.: 18/066,870

(22) Filed: Dec. 15, 2022

(65) Prior Publication Data

US 2024/0015642 A1 Jan. 11, 2024

Related U.S. Application Data

(60) Provisional application No. 63/368,031, filed on Jul. 8, 2022.

(51) Int. Cl.
| | |
|---|---|
| *H04W 40/12* | (2009.01) |
| *H04W 24/04* | (2009.01) |
| *H04W 48/18* | (2009.01) |
| *H04W 76/38* | (2018.01) |
| *H04W 88/06* | (2009.01) |

(52) U.S. Cl.
CPC ........... *H04W 48/18* (2013.01); *H04W 24/04* (2013.01); *H04W 76/38* (2018.02); *H04W 88/06* (2013.01)

(58) Field of Classification Search
CPC . H04L 1/22; H04L 45/22; H04L 45/24; H04L 45/247; H04W 48/18; H04W 24/04; H04W 40/12; H04W 76/15; H04W 76/19; H04W 76/38; H04W 88/06; Y02D 30/70
See application file for complete search history.

(56) References Cited

U.S. PATENT DOCUMENTS

| 9,565,594 B2 * | 2/2017 | Du ...................... H04W 28/065 |
| 11,337,263 B2 * | 5/2022 | Zhou ..................... H04L 1/1621 |

(Continued)

FOREIGN PATENT DOCUMENTS

WO 2022055323 A1 3/2022

OTHER PUBLICATIONS

Cariou et al., 802.11 GEN8 Study Group, <https://mentor.ieee.org/802.11/dcn/22/11-22-0729-00-0wng-next-generation-after-802-11be-follow-up.pptx>.

(Continued)

*Primary Examiner* — Frank Duong
(74) *Attorney, Agent, or Firm* — Patterson + Sheridan, LLP (57) ABSTRACT

A system includes a memory and a processor communicatively coupled to the memory. The processor, in response to determining that a first number of transmissions over a first link with a first frequency has failed, selects a second link with a second frequency for transmission. The second frequency is lower than the first frequency. The processor also, in response to determining that a second number of transmissions over the second link has failed, one or more of (i) stop the transmissions over the second link or (ii) begins transmissions over a third link with a third frequency. The second number is greater than the first number.

9 Claims, 7 Drawing Sheets

(56) References Cited

U.S. PATENT DOCUMENTS

| | | | |
|---|---|---|---|
| 11,357,066 B2* | 6/2022 | Chu | H04W 8/24 |
| 11,647,493 B2* | 5/2023 | Zhou | H04B 7/06964 |
| | | | 370/225 |
| 12,022,548 B2* | 6/2024 | Zheng | H04W 8/24 |
| 2012/0140804 A1 | 6/2012 | Corral | |
| 2016/0198198 A1* | 7/2016 | Iwami | H04N 21/2343 |
| | | | 725/116 |
| 2019/0215215 A1 | 7/2019 | Maltsev et al. | |
| 2020/0288475 A1 | 9/2020 | Zhang et al. | |
| 2021/0167889 A1 | 6/2021 | Yang et al. | |
| 2021/0212118 A1 | 7/2021 | Lu et al. | |
| 2023/0074899 A1* | 3/2023 | Wang | H04W 40/12 |
| 2023/0140556 A1* | 5/2023 | Ko | H04W 76/15 |
| | | | 370/329 |
| 2023/0155768 A1* | 5/2023 | Schelstraete | H04W 72/0453 |
| | | | 370/329 |
| 2023/0179686 A1* | 6/2023 | Kim | H04W 74/0875 |
| | | | 370/329 |

OTHER PUBLICATIONS

Research and Markets, Wireless Gigabit Market with COVID-19 impact by Product, , Technology Protocol, End-use and Geography, 7 pages, Apr. 1, 2021.

Gonzalez-Prelcic et al., Millimeter Wave communication with out-of-band information, May 4, 2017, <https://arxiv.org/pdf/1703.10638.pdf>.

Zhou et al., IEEE 802.11ay based mmWave WLANs: Design Challenges and Solutions, IEEE Communications Surveys & Tutorials, <https://arxiv.org/pdf/1803.07808.pdf>.

* cited by examiner

LINK COORDINATION IN MULTI-LINK DEVICES

CROSS-REFERENCE TO RELATED APPLICATIONS

This application claims benefit of U.S. provisional patent application Ser. No. 63/368,031 filed Jul. 8, 2022. The aforementioned related patent application is herein incorporated by reference in its entirety.

TECHNICAL FIELD

Embodiments presented in this disclosure generally relate to wireless communication. More specifically, this disclosure relates to link coordination in multi-link devices.

BACKGROUND

Wireless devices may connect to access points to transmit and receive data through the access points. Multi-link devices may form multiple links with the same access point using different frequencies.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a system includes a memory and a processor communicatively coupled to the memory. The processor, in response to determining that a first number of transmissions over a first link with a first frequency has failed, selects a second link with a second frequency for transmission. The second frequency is lower than the first frequency. The processor also, in response to determining that a second number of transmissions over the second link has failed, one or more of (i) stops the transmission over the second link or (ii) begins transmissions over a third link with a third frequency. The second number is greater than the first number.

According to another embodiment, a system includes a memory and a processor communicatively coupled to the memory. The processor transmits a data signal over a first link with a first frequency during a time window and transmits a lower definition version of the data signal over a second link with a second frequency during the time window. The second frequency is lower than the first frequency.

According to another embodiment, a system includes a memory and a processor communicatively coupled to the memory. The processor estimates, based on a quality of a first link with a first frequency between a mobile device and an access point, a quality of a potential second link with a second frequency higher than the first frequency between the mobile device and the access point and determines, based on a movement of the mobile device, a period of time that the mobile device will be located within a coverage area of the access point using the second frequency. The processor also forms, based at least in part on the estimated quality, a second link with the second frequency between the mobile device and the access point during the period of time while maintaining the first link during the period of time.

EXAMPLE EMBODIMENTS

A multi-link device may form multiple links with an access point over different frequencies. For example, the multi-link device may form a 60 gigahertz (GHz) link and a 6 GHZ or 5 GHZ link with an access point. The device may maintain both active links at the same time. Higher frequency links (e.g., 60 GHz links) typically provide faster speeds than lower frequency links, but higher frequency links typically have much shorter range than lower frequency links (e.g., 6 GHz, 5 GHz, and 2.4 GHz links). Higher frequency links are also much more susceptible to being blocked or experiencing interference from physical obstacles (e.g., walls and buildings) than lower frequency links. As a result, higher frequency links may lose connection much more frequently than lower frequency links.

The present disclosure describes various link coordination techniques that help stabilize the connection(s) and dataflow between a device and an access point. In a first technique, the access point transmits over lower frequency links when transmissions over higher frequency links fail. For example, when the access point detects that a number of transmissions (e.g., one transmission) failed over a higher frequency link (e.g., a 60 GHz link), the access point may attempt to transmit over a lower frequency link (e.g., a 6 GHz link). If an even larger number of transmissions (e.g., five transmissions) fails over the lower frequency link, the access point may attempt to transmit over an even lower frequency link (e.g., a 5 GHz link or a 2.4 GHz link). For each step down in frequency, the access point may allow for an even larger number of failed transmissions before trying an even lower frequency link. In this manner, the access point attempts transmissions over links that are likely to be more stable in response to transmission failures.

In a second technique, the access point transmits data over multiple links to provide better quality of service (QoS). For example, when the access point is transmitting data with a certain expected QoS (e.g., video data, voice data, or augmented reality/virtual reality data), the access point may communicate data over a higher frequency link (e.g., a 60 GHz link) and a lower frequency link (e.g., a 6 GHz link, a 5 GHz link, or a 2.4 GHz link). The access point may communicate an uncompressed version of the data over the higher frequency link and a compressed version of the data over the lower frequency link. Alternatively or additionally, the access point may send high definition data over the higher frequency link and low definition data over the lower frequency link. Alternatively of additionally, the access point may send both low definition data and high definition data over the higher frequency link while sending only low definition data over the lower frequency link. As a result, even if communication failures occur over the higher frequency link, a lower quality version of the data is still made available over the lower frequency link.

In a third technique, an access point and a device establish a higher frequency link when the access point or a controller determines that the device is moving in range of the higher frequency coverage area. The access point or controller may evaluate any suitable factors for determining whether to establish this link. For example, the access point or controller may consider an estimated quality of the higher frequency link based on a measured quality of a lower frequency link between the device and the access point or an amount of traffic awaiting transmission at the device. In this manner, the access point and the device may form the higher frequency link when the access point or the controller determines that the link is expected to be strong and when the link is expected to help the device transmit the buffered traffic.

Figure 1:
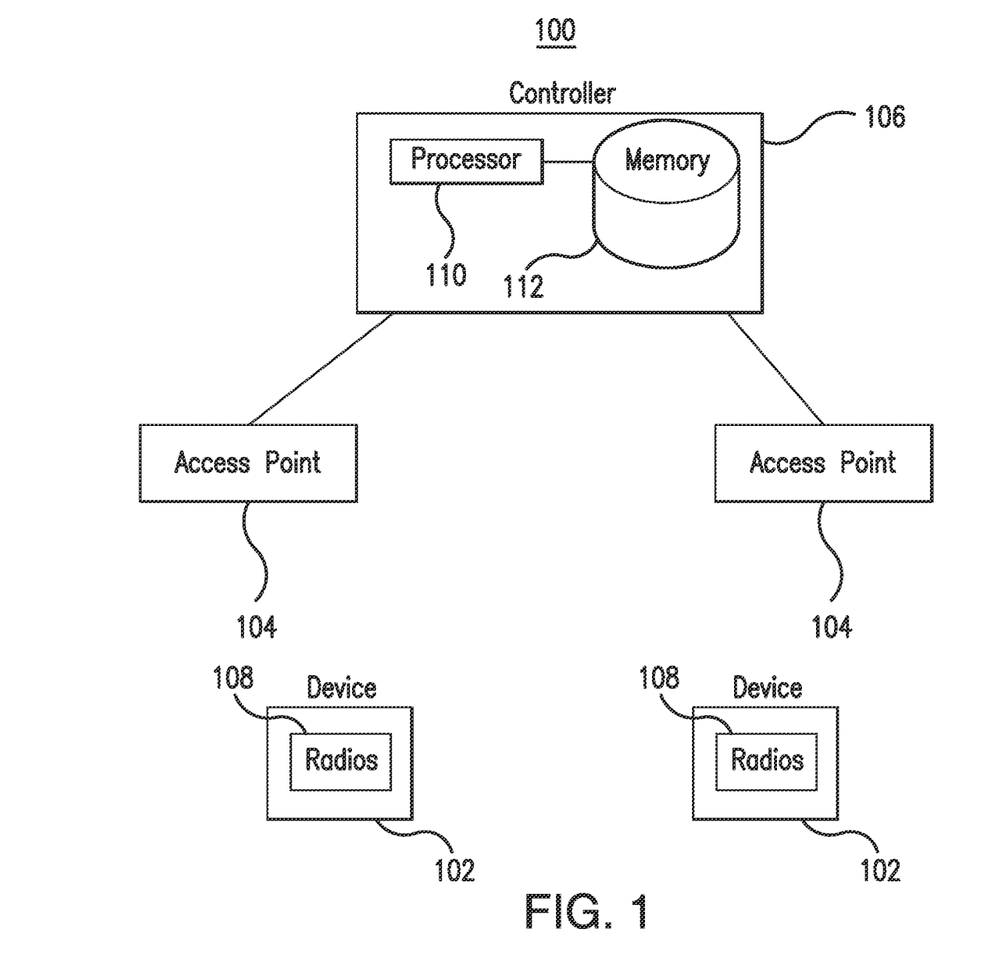
FIG. 1 illustrates an example system.

FIG. 1 illustrates an example system 100. As seen in FIG. 1, the system 100 includes one or more devices 102, one or more access points 104, and a controller 106. Generally, the devices 102 may form one or more links with one or more of the access points 104 in the system 100. The controller 106 coordinates the links formed by the devices 102 with the access points 104.

The device 102 forms connections with the access points 104 to communicate with other networks (e.g., the Internet). As seen in FIG. 1, the device 102 includes one or more radios 108. The device 102 uses one or more of the radios 108 to form connections with the access points 104. For example, the device 102 may use a radio 108 to form a first wireless link with a first access point 104, and the device 102 may use another radio 108 to form a second wireless link with a second access point 104. The two wireless links may use different frequencies. For example, the first wireless links may be formed using a higher frequency (e.g., 60 GHz), and the second wireless link may be formed using a lower frequency (e.g., 6 Ghz, 5 GHz, or 2.4 GHz). The device 102 may communicate over both of the wireless links.

The device 102 is any suitable device for communicating with components of the system 100. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user. The device 102 may include a hardware processor, memory, or circuitry configured to perform any of the functions or actions of the device 102 described herein. For example, a software application designed using software code may be stored in the memory and executed by the processor to perform the functions of the device 102.

The access point 104 facilitates wireless communication in the system 100. Generally, the access point 104 may form one or more wireless links with a device 102. The device 102 and the access point 104 may then communicate over the links. For example, a device 102 may form a first link with the access point 104 using a first frequency. The device 102 may then form a second link with the access point 104 using a second frequency. One of the frequencies may be higher than another frequency. For example, one frequency may be 60 GHz, and the other frequency may be 5 GHz. The access point 104 may form any suitable number of links with the device 102 using any suitable frequencies. In some instances, the device 102 may form multiple links with a single access point 104. In other instances, the device 102 may form multiple links with multiple access points 104 (e.g., one link with one access point 104 and another link with another access point 104). As a result, the device 102 may communicate to one or multiple access points 104 over multiple links using different frequencies.

The controller 106 coordinates the links in the system 100. For example, the controller 106 may coordinate when the device 102 and the access point 104 communicate over a link using a particular frequency. As another example, the controller 106 may coordinate the type of data communicated over a particular link. As yet another example, the controller 106 may coordinate when the device 102 and the access point 104 form or terminate certain links. In some embodiments, the controller 106 is included within or integrated with an access point 104 and coordinates the links formed by that access point 104. For example, each access point 104 may include a controller 106 that coordinates the links of that access point 104. In some embodiments, the controller 106 is separate from the access points 104 and coordinates the links of those access points 104. As seen in FIG. 1, the controller 106 includes a processor 110 and a memory 112 that perform the actions and functions of the controller 106 described herein.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the controller 106. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the controller 106 by processing information (e.g., information received from the devices 102, access points 104, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The controller 106 may implement one or more link coordination techniques that help stabilize connections and dataflow between the devices 102 and the access points 104. In a first technique, the controller 106 may determine when communications should be shifted from a link with a higher frequency to a link with a lower frequency. Generally, the controller 106 may shift communications from a higher frequency link to a lower frequency link in response to detecting a certain number of transmission failures. For example, when the controller 106 detects that a number of transmission failures over a 60 GHz link exceeds a first threshold, the controller 106 may attempt those transmissions over a 6 GHz link. For each step down in frequency, the controller 106 may increase the threshold, which allows for an even larger number of failed transmissions before attempting transmissions on an even lower frequency link. In this manner, the controller 106 attempts transmissions over links that are likely to be more stable in response to transmission failures.

In a second technique, the controller 106 transmits data over multiple links using different frequencies to provide better QOS. For traffic types with a certain expected QOS (e.g., video data, voice data, or augmented reality/virtual reality data), the controller 106 may communicate different versions or qualities of the data over a higher frequency link and a lower frequency link. For example, the controller 106 may communicate an uncompressed version of the data over a 60 GHz link and a compressed version of the data over a 6 GHz link. Alternatively or additionally, the controller 106 may send high definition data over the 60 GHz link and low-definition data over the 6 GHz link. Alternatively or additionally, the controller 106 may send both low-definition data and high-definition data over the 60 GHz link while sending only low-definition data over the 6 GHz link. As a result, even if communication failures occur over the 60 GHz link, a lower quality version of the data is still made available over the 6 GHz link.

In a third technique, the controller 106 coordinates when an access point 104 forms a higher-frequency link with a device 102. For example, the controller 106 may instruct the access point 104 to form a 60 GHz link with the device 102 when the device 102 moves in range of the 60 GHz coverage area of the access point 104, and when the controller 106 estimates that the quality of the 60 GHz link exceeds a threshold or when the controller 106 determines that an amount of buffered traffic awaiting transmission at the device 102 exceeds a threshold. In this manner, the controller 106 may cause the access point 104 and the device 102 to form the higher frequency link when the controller 106 determines that the link is expected to be strong and when the link is expected to help the device transmit buffered traffic.

Figure 2:
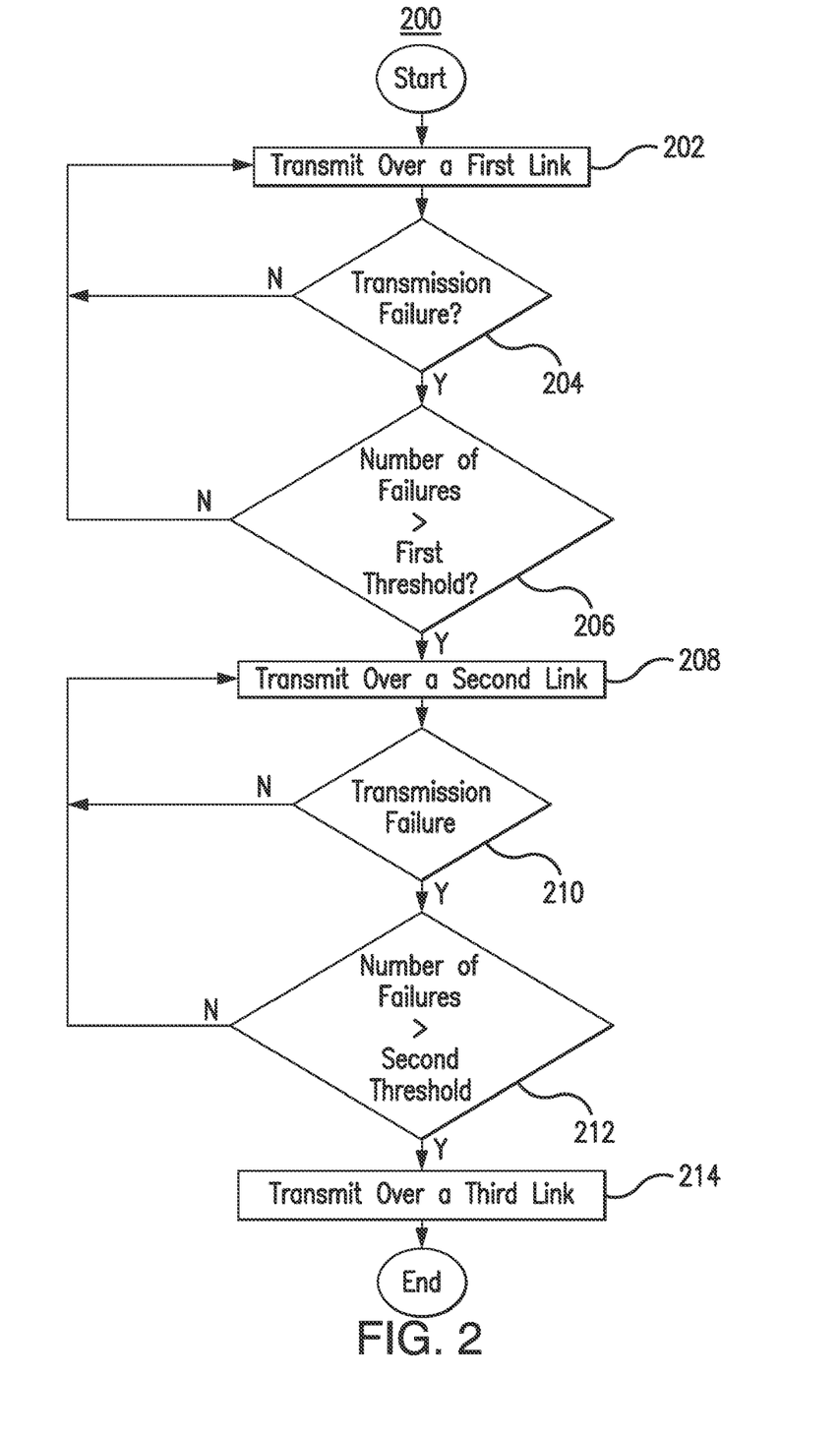
FIG. 2 is a flowchart of an example method performed in the system of FIG. 1.

FIG. 2 is a flowchart of an example method 200 performed in the system 100 of FIG. 1. In particular embodiments, the controller 106 performs the method 200. By performing the method 200, the controller 106 attempts transmissions over lower frequency links in response to transmission failures over higher frequency links (e.g., 60 GHz links).

FIG. 2 is a flowchart of an example method 200 performed in the system 100 of FIG. 1. In particular embodiments, the access point 104 or the controller 106 perform the steps of the method 200. By performing the method 200, the access point 104 or the controller 106 attempts transmissions over a lower frequency link (e.g., a 6 GHz link, 5 GHz link, or 2.4 GHz link) in response to transmission failures over a higher frequency link (e.g., a 6 GHz link).

In block 202, the access point 104 transmits over a first link. The first link may user a higher frequency (e.g., 60 GHz or 6 GHz) than other links described in the method 200. The access point 104 may communicate over the first link to a device 102. In block 204, the access point 104 or the controller 106 detects whether there are transmission failures over the first link. Because the first link may user a higher frequency, the first link may be more susceptible to transmission failures than lower frequency links. For example, the first link may experience shadowing or other forms of interference that substantially impact the quality of the first link. If the access point 104 or the controller 106 determines that there are no transmission failures, then the access point 104 may continue transmitting over the first link.

If the access point 104 or the controller 106 determines that there is a transmission failure, the access point 104 or the controller 106 may determine whether the number of transmission failures exceeds a first threshold in block 206. The access point 104 or the controller 106 may set any suitable threshold as the first threshold. Generally, the first threshold may be lower than other thresholds set for lower frequency links. For example, for a 60 GHz link, the first threshold may be set as one or two failures. If the access point 104 or the controller 106 determine that the number of failures does not exceed the first threshold, the access point 104 or the controller 106 may continue transmitting over the first link.

If the access point 104 or the controller 106 determine that the number of transmission failures exceeds the first threshold, then the access point 104 or the controller 106 may attempt to transmit over a lower frequency link. For example, the controller 106 may instruct the access point 104 to attempt transmissions over a lower frequency link. In response, the access point 104 transmits over a second link in block 208. The second link may have a lower frequency than the first link. For example, if the first link is a 60 GHz link, then the second link may be a 6 GHz, 5 GHz, or a 2.4 GHz link. As another example, if the first link is a 6 GHz link, then the second link may be a GHz link or a 2.4 GHz link.

In some embodiments, the access point 104 or the controller 106 may determine that the transmission failures were caused by packet collisions occurring over the link. In response, the access point 104 or the controller 106 may retry the failed transmissions over the first link before evaluating whether to transition the transmissions to a lower frequency link. Retrying the failed transmissions may result in the transmissions succeeding as a result of the packet collisions resolving or not reoccurring.

In block 210, the access point 104 or the controller 106 determine whether there are transmission failures over the second link. If the access point 104 or the controller 106 determine that there are no transmission failures over the second link, the access point 104 may continue transmitting over the second link. For example, the access point 104 may determine that the first link broke, resulting in the transmission failures. If the access point 104 or the controller 106 determine that there are transmission failures over the second link, the access point 104 or the controller 106 may determine whether the number of transmission failures over the second link exceeds a second threshold. The access point 104 or the controller 106 may set the second threshold to be any suitable number. Generally, the second threshold is greater than the first threshold set for the first link. In some embodiment, the second threshold is three to five failures. If the access point 104 or the controller 106 determine that the number of transmission failures over the second link does not exceed the second threshold, then the access point 104 may continue transmitting over the second link.

If the access point 104 or the controller 106 determine that the number of transmission failures over the second link exceeds the second threshold, the access point 104 may attempt transmissions over an even lower frequency link. For example, the controller 106 may instruct the access point 104 to attempt transmissions over an even lower frequency link than the second link. In response, the access point 104 attempts transmissions over a third link in block 214. The third link may user a lower frequency than the second link. For example, if the second link is a 6 GHz link, then the third link may be a 5 GHz or a 2.4 GHz link. As another example, if the second link is a GHz link, then the third link may be a 2.4 GHz link. In this manner, the access point 104 and the controller 106 attempt transmissions over links that are likely to be more stable in response to transmission failures on higher frequency links.

In some embodiments, the access point 104 or the controller 106 reattempt the failed transmissions when switching to a lower frequency link. In block 208, the access point 104 or the controller 106 retransmit, over the second link, the transmissions that failed over the first link. In block 214, the access point 104 or the controller 106 retransmit, over the third link, the transmissions that failed over the second link. In certain embodiments, instead of retransmitting the transmissions that failed over the second link in block 214, the access point 104 or the controller 106 stops the transmissions that failed over the second link. For example, the access point 104 or the controller 106 may stop attempting the failed transmissions over the second link for a period of time. As another example, the access point 104 or the controller 106 may discard the failed transmissions and not attempt retransmission.

The access point 104 or the controller 106 may select any suitable link in response to transmission failures. For example, the access point 104 or the controller 106 may select the second link in block 208 rather than the third link in response to determining that the second link is available before the third link. As another example, the access point 104 or the controller 106 may select the second link in block 208 rather than retrying the first link in response to determining that the second link is available before the first link. As yet another example, the access point 104 or the controller 106 may determine a quality of service needed for the traffic. The access point 104 or the controller 106 may select the second link in block 208 based on a determination that the second link has the best likelihood of providing the needed quality of service.

Figure 3:
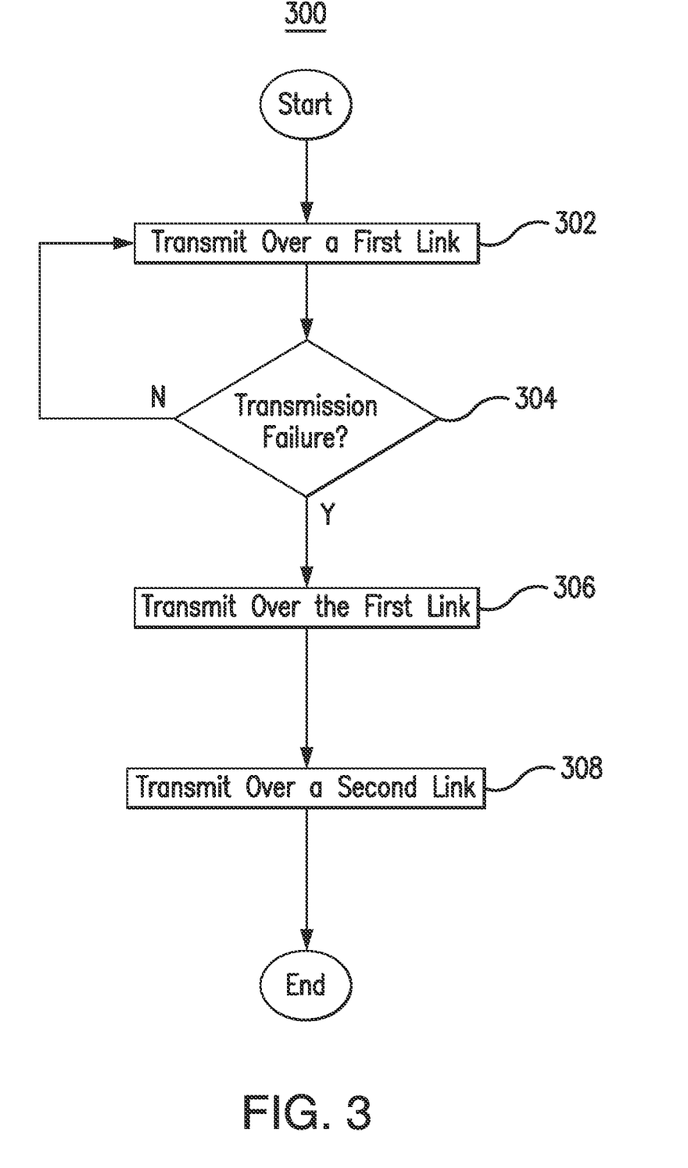
FIG. 3 is a flowchart of an example method performed in the system of FIG. 1.

FIG. 3 is a flowchart of an example method 300 performed in the system 100 of FIG. 1. In particular embodiments, the access point 104 or the controller 106 perform the steps of the method 300. By performing the method 300, the access point 104 or the controller 106 transmit data over multiple links to provide better QoS. Generally, the access point 104 or the controller 106 may perform the method 300 for traffic types with a specified or expected QoS. For example, the access point 104 or the controller 106 may perform the method 300 for video data, voice data, or virtual reality/augmented reality data.

In block 302, the access point 104 transmits data over a first link. The controller 106 may have instructed the access point 104 to transmit data over the first link. The first link may be a higher frequency link (e.g., a 60 GHz link or a 6 GHz link). In block 304, the access point 104 or the controller 106 may determine whether there was a transmission failure over the first link. If there was no transmission failure over the first link, then the access point 104 continues transmitting over the first link.

If the access point 104 or the controller 106 determine that there was a transmission failure over the first link, the access point 104 may transmit over the first link in block 306 and transmit over a second link in block 308. The controller 106 may instruct the access point 104 to transmit over the first link and the second link. The second link may have a lower frequency than the first link. For example, if the first link is a 60 GHz link, then the second link may be a 6 GHz, 5 GHz, or a 2.4 GHz link. As another example, if the first link is a 6 GHz link, then the second link may be a 5 GHz, or a 2.4 GHz link.

Generally, the access point 104 or the controller 106 may cause different data types to be transmitted over the first link and the second link to provide better QoS for the traffic. For example, the access point 104 may transmit an uncompressed version of the data over the first link, and a compressed version of the data over the second link. As a result, even if the first link experiences interference that prevents the uncompressed version of the data from being transmitted or received correctly, the compressed version of the data is still made available over the second link.

As another example, the access point 104 may transmit high-definition data over the first link and low-definition data over the second link. In this manner, even if the first link experiences interference that prevents the high-definition data from being transmitted, the low-definition data is still made available over the second link.

As another example, the access point 104 may transmit both high-definition data and low-definition data over the first link, and the access point 104 may transmit low-definition data over the second link. In this manner, the high-definition data and the low-definition data are made available over the first link. When the first link experiences interference that prevents the high-definition and low-definition data from being transmitted or received correctly over the first link, the lower-definition data is still made available over the second link.

As an example operation, when the access point 104 is transmitting video data to a device 102, the access point 104 may send basic quality frame data over the second link. As a result, the basic quality frame data is sent over a lower frequency, such as 2.4 GHz, 5 GHz, or 6 GHz. The access point 104 may send the heavier high-definition frame data over the first link. As a result, the heavier high-definition frame data is sent over a higher frequency, such as 60 GHz. The device 102 may receive the basic quality frame data over the second link and the heavier high-definition frame data over the first link. The device 102 may then combine the basic quality frame data with the heavier high-definition frame data to generate high-definition images. If the connection over the first link is lost, the device 102 may still receive the basic quality frame data over the second link.

The device 102 may then present the video using the basic quality frames, thereby providing a desired QoS for the video stream.

As another example operation, the access point 104 may send basic quality frame data over the second link and all of the video data over the first link. As a result, the basic quality frame data is sent using a lower frequency (e.g., 2.4 GHz, 5 GHz, or 6 GHz), and the basic quality frame data and the heavier high-definition frame data is sent using the higher frequency (e.g., 60 GHz). The device 102 may receive all of the video data over the higher frequency link and the basic quality frame data over the lower frequency link. If the device 102 loses the connection over the higher frequency link, the device may still receive the basic quality frame data over the lower frequency link. The device 102 may then present the video using the basic quality frame data, thereby providing a desired QoS for the video stream.

Figure 4:
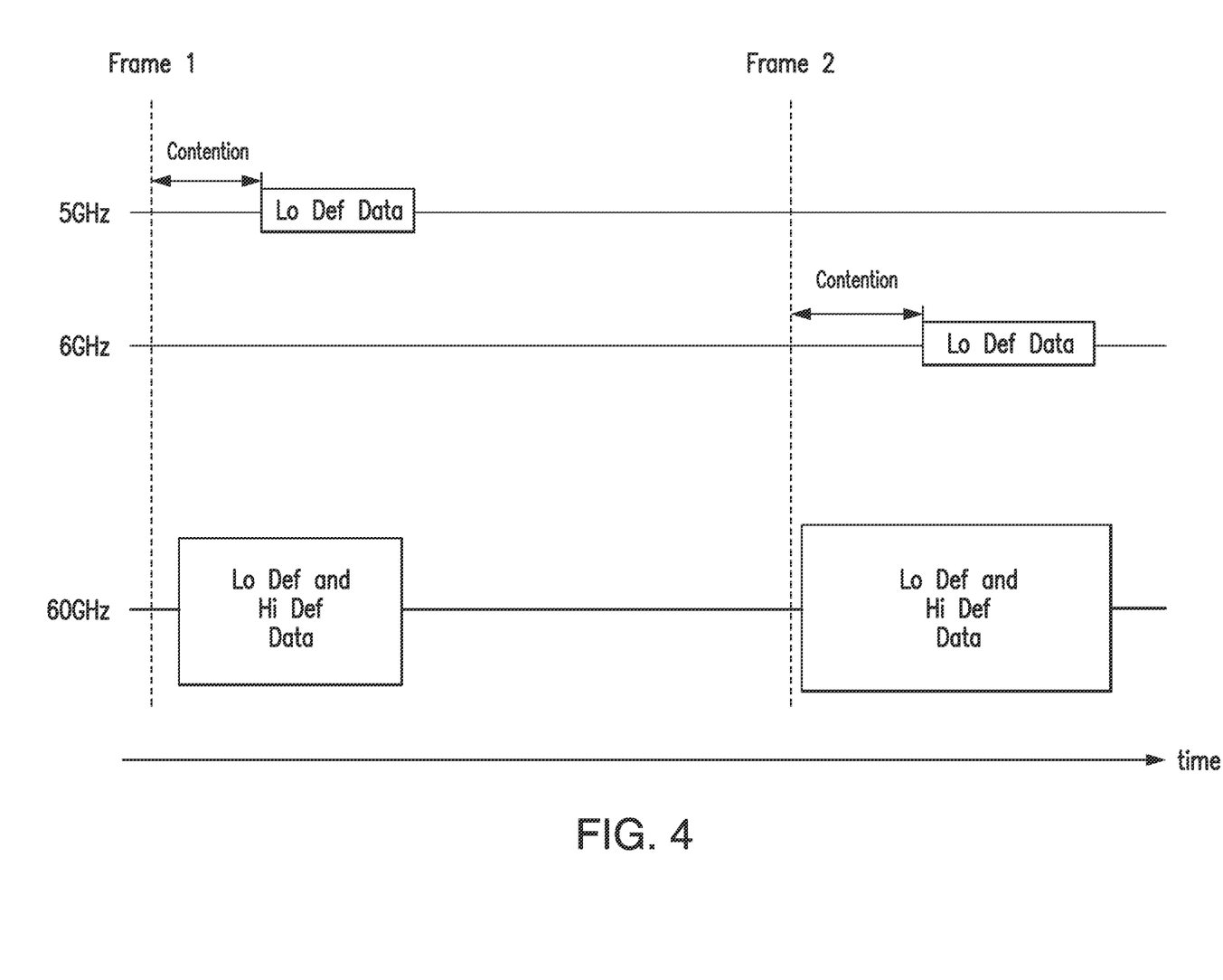
FIG. 4 illustrates an example of coordinating links in the system of FIG. 1.

FIG. 4 illustrates an example of coordinating links in the system 100 of FIG. 1. As seen in FIG. 4, two frames of video data are communicated over different links using different frequencies. For Frame 1, both low-definition and high-definition data are communicated over a 60 GHz link. For example, an access point 104 may communicate both the low-definition and high-definition data over a 60 GHz link to a device 102. Additionally, the access point 104 communicates the low-definition data over a 5 GHz link with the device 102. In this manner, the device 102 receives both the low-definition and high-definition data over the 60 GHz link, and the device 102 receives the low-definition data over the 5 GHz link. If the 60 GHz link experiences interference or is interrupted, the device 102 may still receive the low-definition from the GHz link and may present the video using the low-definition data.

For Frame 2, the access point 104 transmits the low-definition data and the high-definition data using the 60 GHz link. Additionally, the access point 104 communicates the low-definition data using a 6 GHz link. In this manner, the device 102 receives the low-definition data and the high-definition data over the 60 GHz link. The device 102 also receives the low-definition data over the 6 GHz link. As a result, if the 60 GHz link experiences interference or is interrupted, the device 102 may still receive the low-definition data over the 6 GHz link. The device 102 may then present the video using the low-definition data from the 6 GHz link.

In certain embodiments, the access point 104 selects the 5 GHz link or the 6 GHz link for transmitting the low-definition data to the device 102 after a contention period. During the contention period, the access point 104 may check to see which frequency provides better service for the device 102. For example, if the quality of the 6 GHz link is suitable for transmitting the low-definition data to the device 102, then the access point 104 may select the 6 GHz link over the 5 GHz link. As another example, if the quality of the 6 GHz link is not suitable for transmitting the low-definition data, then the access point 104 may select the 5 GHz link for transmitting the low-definition data. As a result, the access point 104 may select the 6 GHz link over the 5 GHz link when the 6 GHz link provides a suitable connection.

Figure 5:
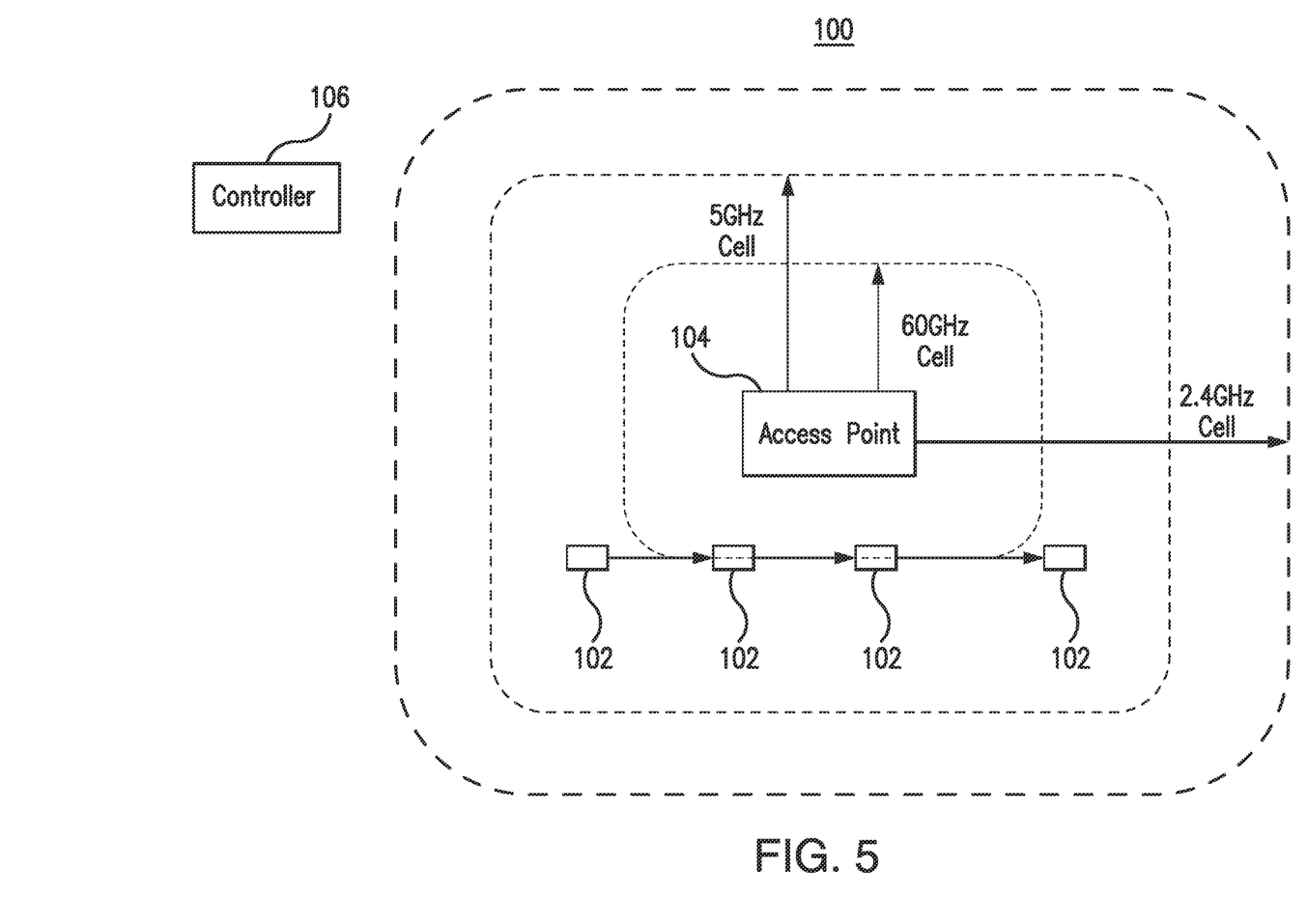
FIG. 5 illustrates an example of coordinating links in the system of FIG. 1.

FIG. 5 illustrates an example of coordinating links in the system 100 of FIG. 1. As seen in FIG. 5, an access point 104 may communicate with a device 102 using different frequencies. The access point 104 may provide different coverage areas using the different frequencies. The device 102 may move through these coverage areas or cells and communicate with the access point 104 using the various frequencies.

As seen in FIG. 5, the access point 104 provides different coverage areas or cells using different frequencies. Generally, the higher the frequency, the smaller the coverage area or cell provided by that frequency. As a trade-off, the access point 104 may transmit more data faster using a higher frequency than a lower frequency. In the example of FIG. 5, the access point 104 may transmit using 2.4 GHz, 5 GHz, or 60 GHz frequencies. The 2.4 GHz frequency provides the largest coverage area or cell. The 5 GHz frequency provides a smaller coverage area or cell than the 2.4 GHz frequency. The 60 GHz frequency provides a smaller coverage area or cell than the 5 GHz frequency. When the device 102 is positioned within a coverage area or cell, the device 102 may communicate with the access point 104 using the frequency of that cell. For example, when the device 102 is in the coverage area or cell provided by the 60 GHz frequency, the device 102 may communicate with the access point 104, using any of the 2.4 GHz, 5 GHz, or 60 GHz frequencies. When the device 102 is located within the 5 GHz cell, the device 102 may communicate using the 5 GHz or 2.4 GHz frequencies. When the device 102 is positioned within the 2.4 GHz cell, the device 102 may communicate with the access point 104 using the 2.4 GHz frequency. In some embodiments, the access point 104 may also communicate with the device 102 using a 6 GHz frequency. The coverage area or cell provided by the 6 GHz frequency is larger than the 60 GHz cell and smaller than the 5 GHz cell.

Generally, the access point 104 (or a controller 106) may coordinate the links between the access point 104 and the device 102 by monitoring and predicting the movement and needs of the device 102. For example, as the device 102 moves through the coverage area of the access point 104, the access point 104 may estimate when the device 102 will move into a coverage area or cell serviced by a different frequency. The access point 104 may also monitor an amount of buffered traffic awaiting transmission at the device 102 to assess the needs of the device 102. Using this information, the access point 104 may determine when the device 102 can transmit over a higher frequency with the access point 104, and when the device 102 should transmit over the higher frequency with the access point 104. The access point 104 may then allow the device 102 to transmit over the higher frequency during a period of time when the device 102 is within the coverage area or cell of the higher frequency. The device 102 may then transmit data over the higher frequency, which may alleviate the buffered traffic awaiting transmission at the device 102.

The access point 104 or the controller 106 may begin by determining which devices 102 in the coverage area of the access point 104 are capable of forming multiple links with the access point 104. The access point 104 or the controller 106 may determine the devices 102 with this capability by analyzing the probe request and association response from the devices 102 in the coverage of the access point 104. In some embodiments, the access point 104 or the controller 106 may track the devices 102 that are capable of forming multiple links with the access point 104 and that are capable of forming a 60 GHz link with the access point 104. In certain embodiments, the access point 104 or the controller 106 also track the devices 102 that track other access points 104 with simultaneous transmit and receive (STR) capabilities using the 60 GHz frequency.

In particular embodiments, the access point 104 or the controller 106 prunes the tracked devices 102 (e.g., the devices 102 that can form multiple links and that can form 60 GHz links). For example, the access point 104 or the controller 106 may determine the devices 102 that are multi-link multi-radio (MLMR) devices (e.g., simultaneous transmit and receive (STR) and non-STR (nSTR) devices) and the devices 102 that are multi-link single radio (MLSR) devices. The access point 104 or the controller 106 may also determine the MLSR devices that are enhanced MLSR (eMLSR) devices and the MLSR devices that are single radio (SR) devices. The access point 104 or the controller 106 may prioritize the MLMR devices in the subsequent steps of this technique. The access point 104 or the controller 106 may also prune the SR devices from further tracking. In some embodiments, the access point 104 or the controller 106 also prune eMLSR devices that do not support dynamic secondary link enablement using the 60 GHz frequency from further tracking.

The access point 104 and the controller 106 track the proximity between the remaining tracked devices 102 and the access point 104 (which may be a STR access point). The access point 104 and the controller 106 may also track the traffic patterns for each of the tracked devices 102. For example, the access point 104 and the controller 106 may track the receiver and transmitter utilization per device 102 or the quality of service and traffic patterns per device 102. Devices 102 with higher load patterns may be subject to further evaluation.

For devices 102 with higher load, the access point 104 or the controller 106 periodically analyzes the buffer status reports of these devices 102 to evaluate the total buffered traffic at these devices 102. The frequency of this evaluation may vary depending on the historical amount of utilization (e.g. receiver and transmitter utilization) of these devices or whether traffic patterns from these devices 102 are more bursty rather than continuous.

For a device 102 with higher buffered traffic or a certain traffic type with higher quality of service expectations (e.g., video data, voice data, or virtual reality/augmented reality data), the access point 104 or the controller 106 estimates the quality (e.g., a received signal strength indicator (RSSI)) of a potential higher frequency link (e.g., a 60 GHz link) between the device 102 and the access point 104 using the quality of an existing lower frequency link (e.g., a 6 GHz, 5 GHZ, or 2.4 GHz link). For example, the access point 104 or controller 106 may determine a probability that the device 102 is within line of sight of the access point 104 using the combined line of sight inputs from the lower frequency link(s). For example, the access point 104 or controller 106 may determine that the device 102 is within line of sight of the access point 104 and therefore estimate that the quality of a potential 60 GHz link is high or good. As another example, the access point 104 or the controller 106 may determine that the device 102 is not within line of sight of the access point 104 and therefore estimate that the quality of the potential 60 GHz link is low or not good.

Additionally, the access point 104 or controller 106 may track the movement of the device 102 to determine a period of time when the device 102 is expected to be located in the coverage area or cell of the higher frequency. For example, using the movement patterns of the device 102, the access point 104 or controller 106 may determine a period of time when the device 102 is expected to be located in the 60 GHz cell of the access point 104. The access point 104 or controller 106 may also determine an amount of time that the device 102 may need to transmit the buffered traffic at the device 102. Using this timing information, the access point 104 or controller 106 may determine when the device 102 should form a higher frequency link with the access point 104. For example, the access point 104 or controller 106 may determine the period of time in which the device 102 is expected to be located in the higher frequency coverage area and how much time the device 102 should be given to communicate using the higher frequency.

The access point 104 or controller 106 may then allow the device 102 to form the higher frequency link with the access point 104 within the period of time when the device 102 is located in the higher frequency coverage area. The device 102 may then communicate over the higher frequency link. In some embodiments, the device 102 transmits the buffered traffic over both the higher frequency link and the existing, lower frequency link. Some of the buffered traffic is communicated using the higher frequency link and some of the buffered traffic is communicated using the lower frequency link. When the device 102 has transmitted the buffered traffic or when the amount of time that the device 102 should be given to communicate using the higher frequency has been reached, the access point 104 or controller 106 may terminate the higher frequency link to allow other devices 102 to form and use a higher frequency link with the access point 104.

The access point 104 or controller 106 may form the higher frequency link with the devices 102 in any suitable manner. For MLMR devices, the access point 104 may advertise the higher frequency radio's frequency and bandwidth in the reduced neighbor report (RNR) on the existing link with the device 102. Subsequently, the access point 104 may migrate the device's 102 secondary link to the higher frequency (e.g., using a 11v basic service set (BSS) transition). In some embodiments, the access point 104 provides a 11k neighbor report over the existing and new links in the event the 11v BSS transition is not honored by the device 102. During this transition, the existing link of the device 102 will continue operations. As another example, for eMLSR devices using dynamic link transitions, the access point 104 notifies these devices to enable their higher frequency links (e.g., 60 GHz) for traffic reception when such devices come into close proximity with line of sight of the access point's 104 higher frequency radio (e.g., 60 GHz radio). Upon data transfer completion, the access point 104 can use dynamic link transitions or 11v BSS transition to terminate the higher frequency link and migrate to a lower frequency link.

In some embodiments, the device 102 is an Internet of Things (IoT) device with bursty traffic. For example, the device 102 may be a monitor or equipment sensor. The access point 104 or controller 106 uses the same process to dynamically communicate using higher frequency links (e.g., 5 GHz or 6 GHz links) with the device 102. In certain embodiments for high density use cases where a 2.4 GHz link cannot meet network service level agreements, the access point 104 or controller 106 may keep 2.4 GHz radios in a monitor state by default across the spectrum and then dynamically enable/disable the 2.4 GHz links for sporadic traffic reception.

Figure 6:
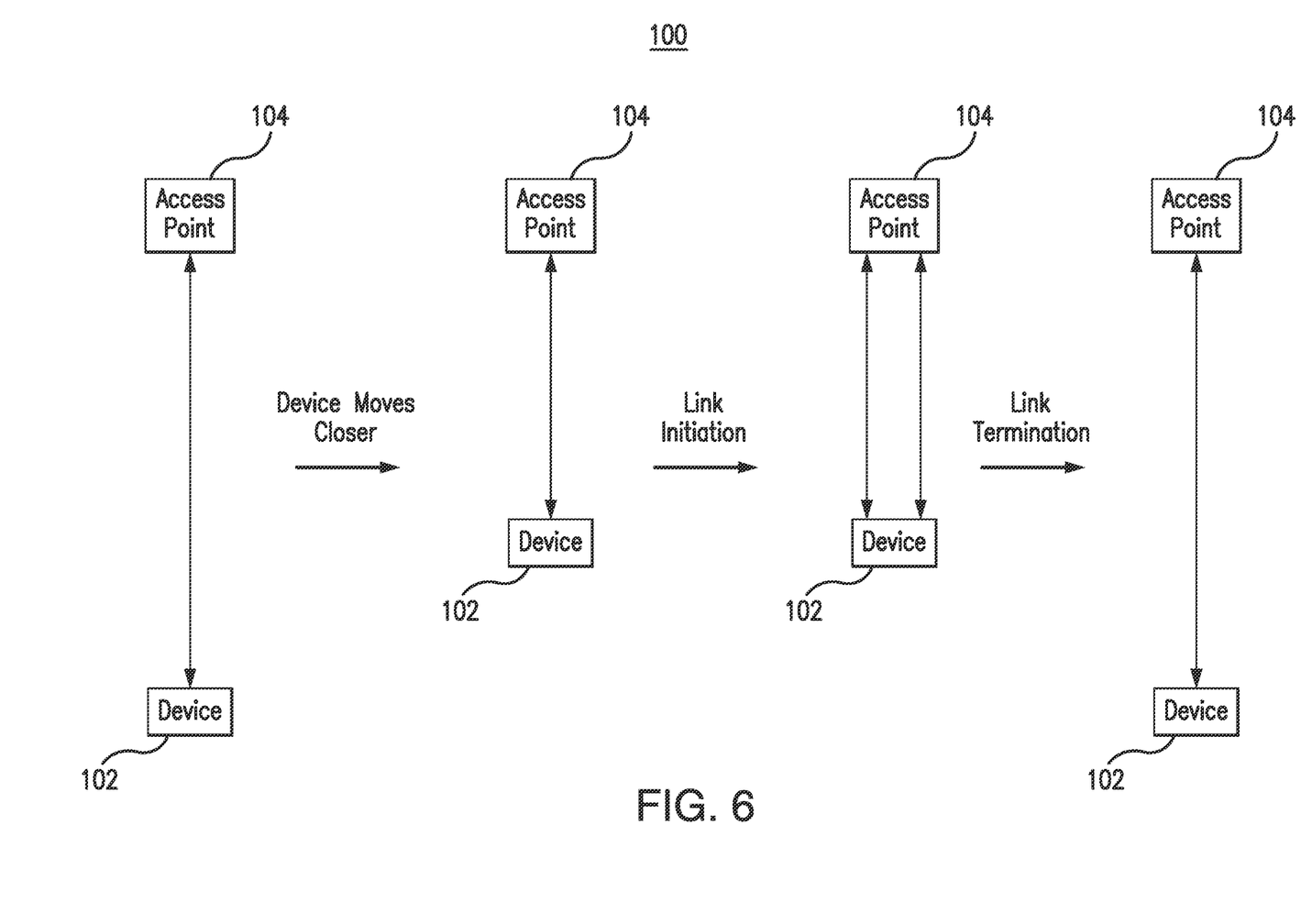
FIG. 6 illustrates an example of coordinating links in the system of FIG. 1.

FIG. 6 illustrates an example of coordinating links in the system 100 of FIG. 1. As seen in FIG. 6, a device 102 may establish multiple links with an access point 104 as the device 102 moves within the coverage area of the access point 104. Specifically, the device 102 starts a certain distance from the access point 104 on the left side of FIG. 6. The device 102 then moves closer to the access point 104. The access point 104 may track the movement of the device 102 within the coverage area of the access point 104. The access point 104 may determine that the device 102 is expected to move within a coverage area with a higher frequency at a particular time. The access point 104 may also monitor buffered traffic awaiting transmission at the device 102 by analyzing the buffer status reports from the device 102. Using that information, the access point 104 may determine that the device 102 should establish a higher frequency link with the access point 104 during the period of time when the device 102 is within the higher frequency coverage area or cell to communicate some of the buffered traffic awaiting transmission at the device 102.

When the device 102 enters the higher frequency coverage area, the access point 104 may initiate the second link with the device 102. The device 102 may form the second link with the access point 104 and begin transmitting some of the buffered traffic awaiting transmission at the device 102 over the second link. After the device 102 finishes transmitting the traffic or when the device 102 leaves the higher frequency coverage area, the access point 104 and the device 102 may terminate the second link. As a result, the device 102 retains the original link with the access point 104. In this manner, the access point 104 coordinates the links with the device 102 as the device 102 moves through the coverage area of the access point 104.

Figure 7:
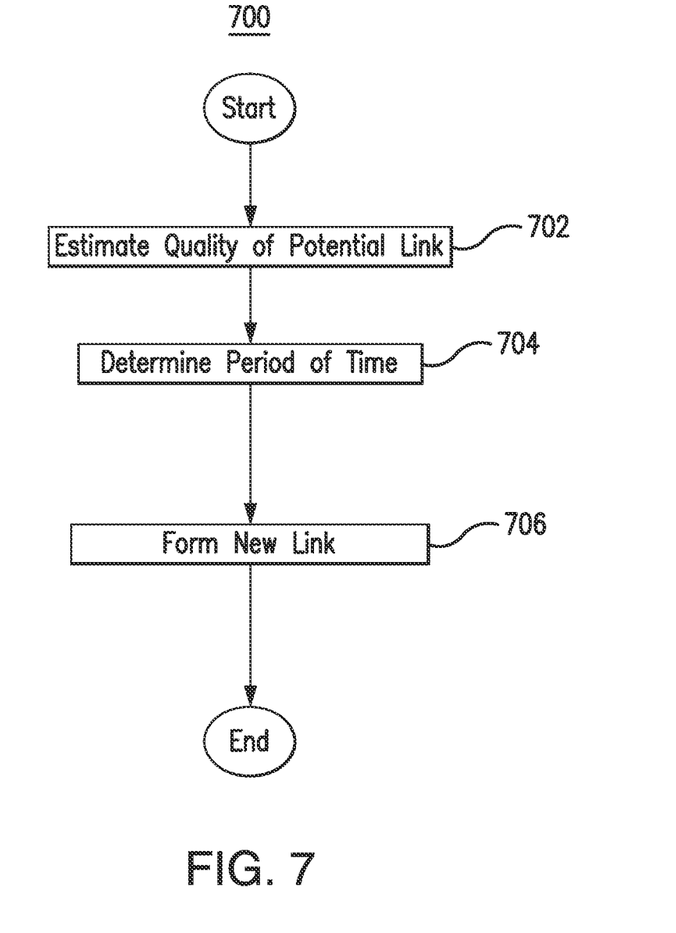
FIG. 7 is a flowchart of an example method performed in the system of FIG. 1.

FIG. 7 is a flowchart of an example method 700 performed in the system 100 of FIG. 1. In particular embodiments, an access point 104 or controller 106 perform the steps of the method 700. By performing the method 700, the access point 104 or the controller 106 coordinates the links of a device 102 as the device 102 moves through the coverage area of the access point 104.

In block 702, the access point 104 or the controller 106 estimates a quality of a potential link with the device 102. The access point 104 or the controller 106 may estimate the quality of a potential link with a higher frequency than the link the device 102 is using to communicate with the access point 104. For example, the access point 104 may use the quality of a 5 GHz link with the device 102 to estimate the quality of a potential 60 GHz link with the device 102. If the estimated quality of the potential link is suitable or exceeds the threshold, then the access point 104 or the controller 106 may determine that the device 102 may benefit from forming the potential higher frequency link with the access point 104.

In block 704, the access point 104 or the controller 106 determines a period of time when the device 102 is expected to be in the coverage area or cell of the higher frequency. For example, the access point 104 or the controller 106 may monitor the movement of the device 102 through the coverage area of the access point 104. By tracking this movement, the access point 104 or the controller 106 may predict when the device 102 will be in the coverage area of the higher frequency. The access point 104 or the controller 106 may determine a start time when the device 102 is expected to enter the coverage area of the higher frequency and an end time when the device 102 is expected to leave the coverage area of the higher frequency.

In block 706, the access point 104 may form a new link of the higher frequency with the device 102. The access point 104 may form this new link during the period of time determined in block 704 and if the quality of the potential link estimated in block 702 is suitable or exceeds a threshold. In some embodiments, the access point 104 may also determine, from the buffer status reports from the device 102, an amount of buffered traffic awaiting transmission at the device 102. If the amount of traffic exceeds a threshold, then the access point 104 may determine that the new link should be formed. In response, the access point 104 may form the new link in block 706. As a result, the access point 104 may consider an estimated quality of a potential link, a period of time when the device 102 is expected to be in the coverage area of the higher frequency, and an amount of buffered traffic awaiting transmission at the device 102 to determine whether the access point 104 should form the new link with the device 102.

In some embodiments, the access point 104 or controller 106 determine an amount of time that the device 102 may need to transmit the buffered traffic at the device 102. When this amount of time expires after forming the new link, the access point 104 or controller 106 terminate the link. In certain embodiments, the access point 104 or controller 106 determine an amount of time that the device 102 is expected to be located in the higher frequency coverage area. The access point 104 or controller 106 terminate the new link after this amount of time has expired.

In summary, the access point 104 or controller 106 implement various link coordination techniques that help stabilize the connection(s) and dataflow between a device 102 and the access point 104. In a first technique, the access point 104 transmits over lower frequency links when transmissions over higher frequency links fail. For example, when the access point 104 detects that a number of transmissions (e.g., one transmission) failed over a higher frequency link (e.g., a 60 GHz link), the access point 104 may attempt to transmit over a lower frequency link (e.g., a 6 GHz link). If an even larger number of transmissions (e.g., five transmissions) fails over the lower frequency link, the access point 104 may attempt to transmit over an even lower frequency link (e.g., a 5 GHz link). For each step down in frequency, the access point 104 may allow for an even larger number of failed transmissions before trying an even lower frequency link. In this manner, the access point 104 attempts transmissions over links that are likely to be more stable in response to transmission failures.

In a second technique, the access point 104 transmits data over multiple links to provide better quality of service (QoS). For example, when the access point 104 is transmitting data with a certain expected QoS (e.g., video data, voice data, or augmented reality/virtual reality data), the access point 104 may communicate data over a higher frequency link (e.g., a 60 GHz link) and a lower frequency link (e.g., a 6 GHz link, a 5 GHz link, or a 2.4 GHz link). The access point 104 may communicate an uncompressed version of the data over the higher frequency link and a compressed version of the data over the lower frequency link. Alternatively or additionally, the access point 104 may send high definition data over the higher frequency link and low definition data over the lower frequency link. Alternatively of additionally, the access point 104 may send both low definition data and high definition data over the higher frequency link while sending only low definition data over the lower frequency link. As a result, even if communication failures occur over the higher frequency link, a lower quality version of the data is still made available over the lower frequency link.

In a third technique, an access point 104 and a device 102 establish a higher frequency link when the access point 104 or controller 106 determines that the device 102 is moving in range of the higher frequency coverage area. The access point 104 or controller 106 may evaluate any suitable factors for determining whether to establish this link. For example, the access point 104 or controller 106 may consider an estimated quality of the higher frequency link based on a measured quality of a lower frequency link between the device 102 and the access point 104 or an amount of buffered traffic awaiting transmission at the device 102. In this manner, the access point 104 and the device 102 may form the higher frequency link when the access point 104 or the controller 106 determines that the link is expected to be strong and when the link is expected to help the device transmit the buffered traffic.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system comprising:
a memory; and
a processor communicatively coupled to the memory, the processor configured to:
in response to determining that a first number of transmissions over a first link with a first frequency has failed, select a second link with a second frequency for transmission, wherein the second frequency is lower than the first frequency; and
in response to determining that a second number of transmissions over the second link has failed, one of (i) stop the transmissions over the second link or (ii) begin transmissions over a third link with a third frequency, wherein the second number is greater than the first number.

2. The system of claim 1, wherein the first number is one.

3. The system of claim 1, wherein selecting the second link for transmission is further in response to determining that the second link is available before the third link.

4. The system of claim 1, wherein selecting the second link for transmission is further in response to determining that the second link is available before the first link.

5. The system of claim 1, wherein selecting the second link is based on a quality of service for the first number of transmissions.

6. The system of claim 1, wherein the first frequency is 60 gigahertz.

7. The system of claim 6, wherein the second frequency is 5 gigahertz, 6 gigahertz, or 2.4 gigahertz.

8. The system of claim 1, wherein selecting the second link is further in response to a determination that the first link broke.

9. The system of claim 1, wherein the processor is further configured to retry a transmission over the first link in response to a determination that a prior failed transmission over the first link was caused by packet collision.

\* \* \* \* \*